(12) United States Patent
Byun et al.

(10) Patent No.: US 10,128,710 B2
(45) Date of Patent: Nov. 13, 2018

(54) LINEAR COMPRESSOR AND LINEAR MOTOR FOR A LINEAR COMPRESSOR

(71) Applicant: LG Electronics Inc., Seoul (KR)

(72) Inventors: Jeonguk Byun, Seoul (KR); Eonpyo Hong, Seoul (KR); Jeehyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 746 days.

(21) Appl. No.: 14/668,069

(22) Filed: Mar. 25, 2015

(65) Prior Publication Data

US 2016/0017873 A1 Jan. 21, 2016

(30) Foreign Application Priority Data

Jul. 21, 2014 (KR) .................. 10-2014-0091831

(51) Int. Cl.
| | |
|---|---|
| *H02K 35/04* | (2006.01) |
| *H02K 3/28* | (2006.01) |
| *F04B 35/04* | (2006.01) |
| *F04B 39/00* | (2006.01) |
| *H02K 33/16* | (2006.01) |

(Continued)

(52) U.S. Cl.
CPC .............. *H02K 3/28* (2013.01); *F04B 35/045* (2013.01); *F04B 39/00* (2013.01); *H02K 1/145* (2013.01); *H02K 3/525* (2013.01); *H02K 33/16* (2013.01); *H02K 2203/12* (2013.01)

(58) Field of Classification Search
CPC ........ H02K 33/12; H02K 3/28; H02K 1/2733; H02K 33/16; F04B 35/04; F04B 39/121; F04B 35/00; F04B 39/14; F02G 1/00; F02G 1/043; F25B 9/14
USPC ........................................................... 310/15
See application file for complete search history.

(56) References Cited

U.S. PATENT DOCUMENTS 6,657,326 B1 * 12/2003 Yamamoto ............. H02K 33/16
310/12.24
2006/0091735 A1 5/2006 Song et al.
(Continued)

FOREIGN PATENT DOCUMENTS

| JP | 2000-110718 | 4/2000 |
|---|---|---|
| JP | 2003-523710 | 8/2003 |

(Continued)

OTHER PUBLICATIONS

European Search Report dated Dec. 16, 2015.
Japanese Office Action dated May 29, 2018.

*Primary Examiner* — Bernard Rojas
*Assistant Examiner* — Leda Pham
(74) *Attorney, Agent, or Firm* — KED & Associates LLP

(57) ABSTRACT

A linear compressor and a linear motor for a linear compressor are provided. The linear motor may include a first stator, a second stator spaced apart from the first stator, and at least one permanent magnet disposed between the first stator and the second stator. The first stator may include a bobbin around which a coil may be wound, and a plurality of core blocks that surrounds the bobbin. In at least one core block of the plurality of core blocks, a distance between a first surface that faces the second stator and a second surface of the second stator that faces the first surface varies in a circumferential direction of the second stator.

21 Claims, 10 Drawing Sheets

(51) Int. Cl.
*H02K 1/14* (2006.01)
*H02K 3/52* (2006.01)

(56) References Cited

U.S. PATENT DOCUMENTS

| | | | | |
|---|---|---|---|---|
| 2006/0192441 A1* | 8/2006 | Yoon | ............ | H02K 1/12 |
| | | | | 310/15 |
| 2009/0252623 A1* | 10/2009 | Choi | ............ | H02K 33/02 |
| | | | | 417/416 |
| 2010/0310393 A1* | 12/2010 | Lee | ............ | H02K 1/145 |
| | | | | 417/417 |
| 2013/0058811 A1 | 3/2013 | Hong | | |

FOREIGN PATENT DOCUMENTS

| JP | 2006-194236 | 7/2006 |
|---|---|---|
| JP | 2007-68373 | 3/2007 |

* cited by examiner

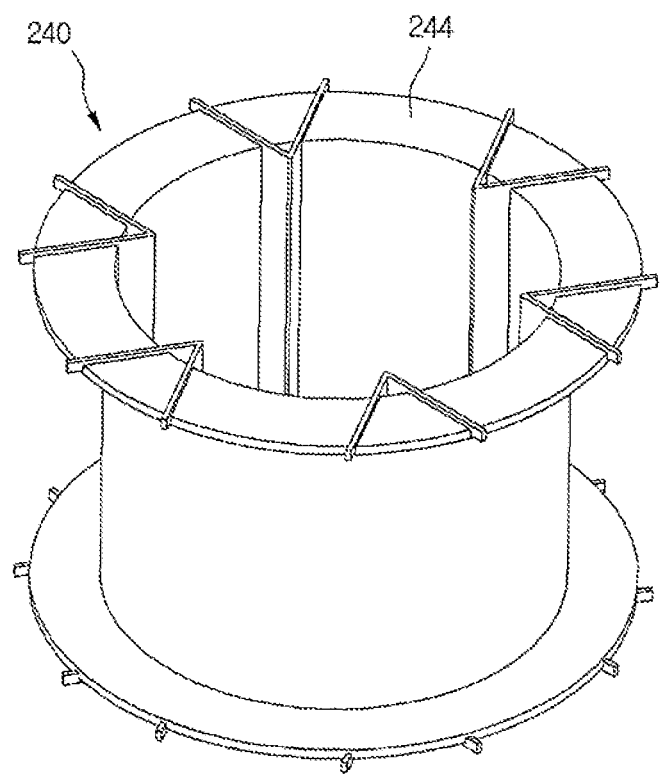

LINEAR COMPRESSOR AND LINEAR MOTOR FOR A LINEAR COMPRESSOR

CROSS-REFERENCE TO RELATED APPLICATION(S)

This application claims priority under 35 U.S.C. § 119 to Korean Application No. 10-2014-0091831, filed in Korea on Jul. 21, 2014, whose entire disclosure is hereby incorporated by reference.

BACKGROUND

1. Field

A linear compressor and a linear motor for a linear compressor are disclosed herein.

2. Background

In general, compressors are mechanisms that receive power from a power generation device, such as an electric motor or turbine, to compress air, a refrigerant, or another working gas, thereby increasing a pressure thereof. Compressors are being widely used in home appliances, such as refrigerators and air-conditioners, or industrial machineries.

Compressors may be largely classified into a reciprocating compressor, in which a compression space into and from which a working gas is suctioned and discharged, is defined between a piston and a cylinder to compress the working gas while the piston is linearly reciprocated within the cylinder, a rotary compressor, in which a compression space into and from which a working gas is discharged and discharged, is defined between a roller and a cylinder to compress a refrigerant while the roller is eccentrically rotated along an inner wall of the cylinder; and a scroll compressor, in which a compression space into and from which a working gas is suctioned and discharged, is defined between an orbiting scroll and a fixed scroll to compress the working gas while the orbiting scroll is rotated along the fixed scroll. In recent years, a linear compressor, which is a reciprocating compressor and in which a piston is linearly reciprocated to improve compression efficiency without mechanical loss due to movement conversion and having a simple structure, has been widely developed. Generally, such a linear compressor is configured to suction and compress a working gas, such as a refrigerant, while the piston is linearly reciprocated within the cylinder by a linear motor in a sealed shell, and then discharge the compressed refrigerant.

BRIEF DESCRIPTION OF THE DRAWINGS

Embodiments will be described in detail with reference to the following drawings in which like reference numerals refer to like elements, and wherein:

FIGS. 5A-5B are views of a bobbin and a core block according to embodiments;

DETAILED DESCRIPTION

Figure 1:
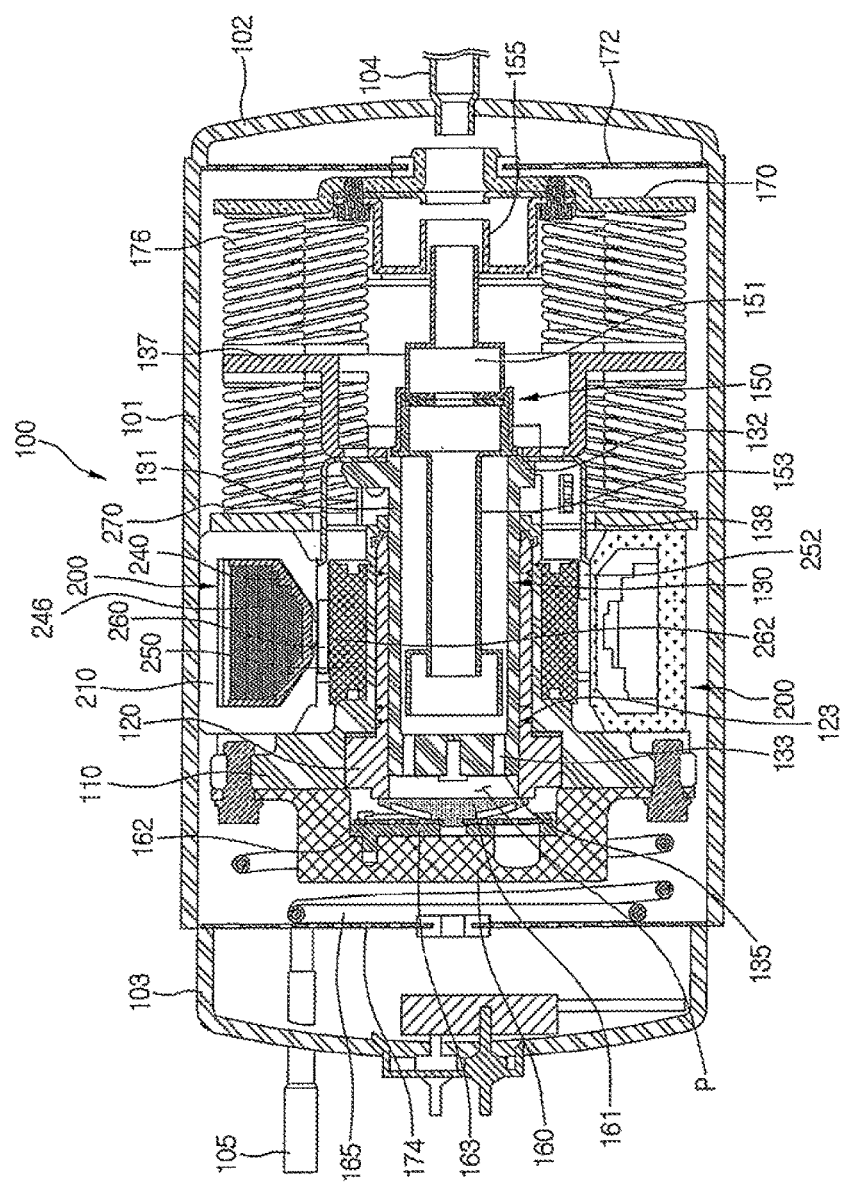
FIG. 1 is a cross-sectional view of a linear compressor according to an embodiment.

Reference will now be made in detail to embodiments, examples of which are illustrated in the accompanying drawings. Where possible, like reference numerals have been used to indicate like elements, and repetitive disclosure has been omitted.

In the following detailed description of embodiments, reference is made to the accompanying drawings that form a part hereof, and in which is shown by way of illustration specific embodiments which may be practiced. These embodiments are described in sufficient detail to enable those skilled in the art to practice, and it is understood that other embodiments may be utilized and that logical structural, mechanical, electrical, and chemical changes may be made without departing from the spirit or scope. To avoid detail not necessary to enable those skilled in the art to practice, the description may omit certain information known to those skilled in the art. The following detailed description is, therefore, not to be taken in a limiting sense.

Figure 2:
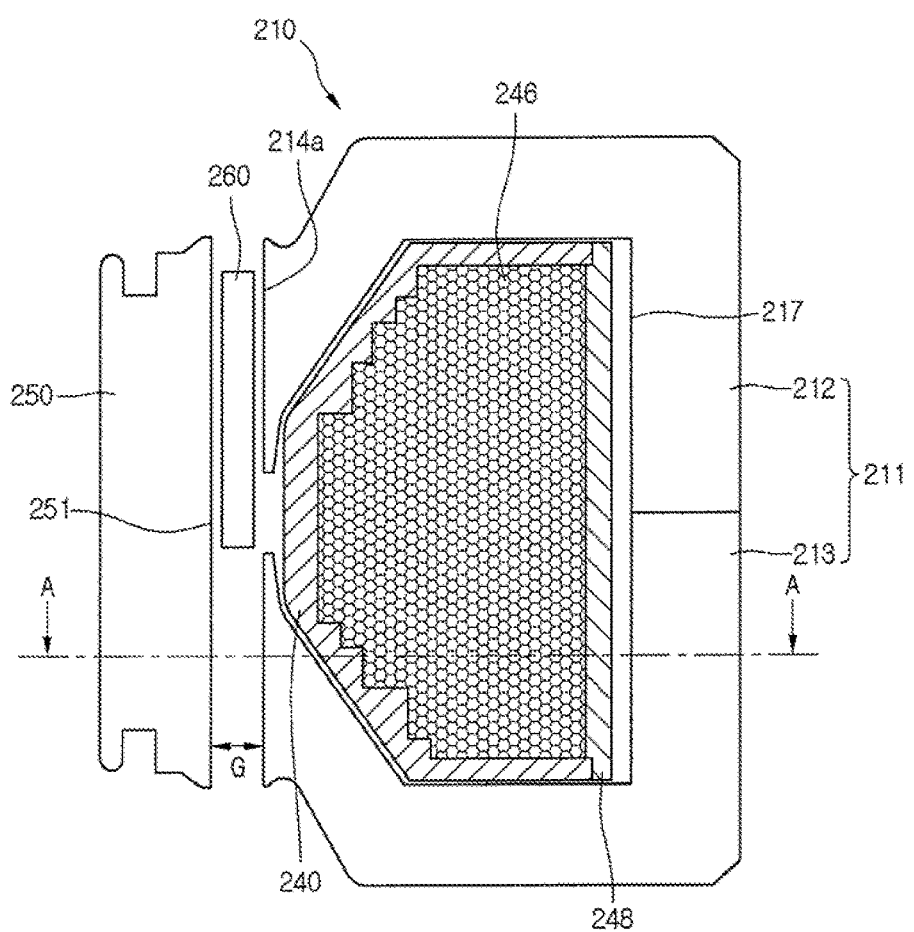
FIG. 2 is a schematic cross-sectional view of a linear motor according to an embodiment.

FIG. 1 is a cross-sectional view of a linear compressor according to an embodiment. FIG. 2 is a schematic cross-sectional view of a linear motor according to an embodiment.

Referring to FIGS. 1 and 2, the linear compressor 100 according to an embodiment may include a shell 101 having an approximately cylindrical shape, a first cover 102 coupled to a first side of the shell 101, and a second cover 103 coupled to a second side of the shell 101. For example, the linear compressor 100 may be mounted on a product in a state in which the linear compressor 100 is laid out in a horizontal direction. The first cover 102 may be disposed on a right or first lateral side of the shell 101, and the second cover 103 may be disposed on a left or second lateral side of the shell 101, with reference to FIG. 1. Each of the first and second covers 102 and 103 may be understood as one component of the shell 101.

The linear compressor 100 may further include a cylinder 120 provided in the shell 101, a piston 130 linearly reciprocated within the cylinder 120, and a motor assembly 200 that serves as a linear motor to apply a drive force to the piston 130. When the linear motor operates, the piston 130 may be linearly reciprocated at a high rate. The linear compressor 100 according to this embodiment may have a drive frequency of about 100 Hz, for example.

The linear compressor 100 may further include a suction inlet 104, through which refrigerant may be introduced, and a discharge outlet 105, through which the refrigerant compressed in the cylinder 120 may be discharged. The suction inlet 104 may be coupled to the first cover 102, and the discharge outlet 105 may be coupled to the second cover 103.

The refrigerant suctioned in through the suction inlet 104 may flow into the piston 130 via a suction muffler 150. While the refrigerant passes through the suction muffler 150, noise may be reduced. The suction muffler 150 may include a first muffler 151, and a second muffler 153 coupled to the first muffler 151. At least a portion of the suction muffler 150 may be disposed within the piston 130.

The piston 130 may include a piston body 131 having an approximately cylindrical shape, and a piston flange 132 that extends from the piston body 131 in a radial direction. The piston body 131 may be reciprocated within the cylinder 120, and the piston flange 132 may be reciprocated outside of the cylinder 120.

The piston 130 may be formed of a non-magnetic material, such as an aluminum-based material, such as aluminum or aluminum alloy. As the piston 130 may be formed of the aluminum material, a magnetic flux generated in the motor assembly 200 may not be transmitted to the piston 130, and thus, may be prevented from leaking outside of the piston 130. The piston 130 may be formed by a forging process, for example.

The cylinder 120 may be formed of a non-magnetic material, such as an aluminum material, such as aluminum or an aluminum alloy. The cylinder 120 and the piston 130 may have a same material composition ratio, that is, a same type and composition ratio. As the cylinder 120 may be formed of the aluminum-based material, the magnetic flux generated in the motor assembly 200 may not be transmitted into the cylinder 120, and thus, may be prevented from leaking outside of the cylinder 120. The cylinder 120 may be formed by extruded rod processing, for example.

Also, as the piston 130 may be formed of the same material as the cylinder 120, the piston 130 may have a same thermal expansion coefficient as the cylinder 120. During operation of the linear compressor 10, a high-temperature environment (about 100° C.) is created in the shell 100. As the piston 130 and the cylinder 120 may have the same thermal expansion coefficient, they may thus have a same amount of thermal deformation. As a result, the piston 130 and the cylinder 120 may be thermally deformed with sizes and in directions different from each other to prevent the piston 130 from interfering with the cylinder 120 while the piston 130 moves.

The cylinder 120 may be configured to accommodate at least a portion of the suction muffler 150 and at least a portion of the piston 130.

A compression space P, in which the refrigerant may be compressed by the piston 130, may be defined in the cylinder 120. A suction hole 133, through which the refrigerant may be introduced into the compression space P, may be defined in a front portion of the piston 130, and a suction valve 135 to selectively open the suction hole 133 may be disposed on a front side of the suction hole 133. A coupling hole, to which a predetermined coupling member may be coupled, may be defined in an approximately central portion of the suction valve 135.

A discharge cover 160 that defines a discharge space or discharge passage for the refrigerant discharged from the compression space P, and a discharge valve assembly 161, 162, and 163 coupled to the discharge cover 160 to selectively discharge the refrigerant compressed in the compression space P may be provided at a front side of the compression space P. The discharge valve assembly 161, 162, and 163 may include a discharge valve 161 to introduce the refrigerant into the discharge space of the discharge cover 160 when a pressure within the compression space P is above a predetermined discharge pressure, a valve spring 162 disposed between the discharge valve 161 and the discharge cover 160 to apply an elastic force in an axial direction, and a stopper 163 to restrict deformation of the valve spring 162.

The term "compression space P" may refer to a space defined between the suction valve 135 and the discharge valve 161. The suction valve 135 may be disposed at a first side of the compression space P, and the discharge valve 161 may be disposed at a second side of the compression space P, that is, at a side opposite of the suction valve 135. Also, the discharge valve 161 may be movably disposed at a front end of the cylinder 120.

The term "axial direction" may refer to a direction in which the piston 130 is reciprocated, or a direction in which "a permanent magnet" is reciprocated. Also, in the axial direction, a direction from the suction inlet 104 toward the discharge outlet 105, that is, a direction in which the refrigerant flows, may be referred to as a "frontward direction", and a direction opposite to the frontward direction may be referred to as a "rearward direction". The term "radial direction" may be referred to as a direction perpendicular to the direction in which the piston 130 is reciprocated.

The stopper 163 may be seated on the discharge cover 160, and the valve spring 162 may be seated at a rear side of the stopper 163. The discharge valve 161 may be coupled to the valve spring 162, and a rear portion or rear surface of the discharge valve 161 may be supported by a front surface of the cylinder 120. The valve spring 162 may include a plate spring, for example.

While the piston 130 is linearly reciprocated within the cylinder 120, when the pressure of the compression space P is below the predetermined discharge pressure and a predetermined suction pressure, the suction valve 135 may be opened to suction the refrigerant into the compression space P. On the contrary, if the pressure of the compression space P is above the predetermined suction pressure, the refrigerant in the compression space P may be compressed in a state in which the suction valve 135 is closed.

When the pressure of the compression space P is the predetermined discharge pressure or more, the valve spring 162 may be deformed to open the discharge valve 161, and the refrigerant may be discharged from the compression space P into the discharge space of the discharge cover 160. The refrigerant flowing into the discharge space of the discharge cover 160 may be introduced into a loop pipe 165. The loop pipe 165 may be coupled to the discharge cover 160 to extend to the discharge outlet 105, thereby guiding the compressed refrigerant in the discharge space into the discharge outlet 105. For example, the loop pipe 165 may have a shape which is wound in a predetermined direction and extends in a rounded shape. The loop pipe 165 may be coupled to the discharge outlet 105.

The linear compressor 100 may further include a frame 110 coupled to the outside of the cylinder 120. The frame 110 may fix the cylinder 120 and be coupled to the cylinder 120 by a separate coupling member, for example. The frame 110 may be disposed to surround the cylinder 120. That is, the cylinder 120 may be accommodated within the frame 110. The discharge cover 160 may be coupled to a front surface of the frame 110.

At least a portion of the high-pressure gaseous refrigerant discharged through the open discharge valve 161 may flow toward an outer circumferential surface of the cylinder 120 through a space formed at a portion at which the cylinder 120 and the frame 110 are coupled to each other. The refrigerant may be introduced into the cylinder 120 through one or more nozzle 123 disposed on the cylinder 120. The introduced refrigerant may flow into a space defined between the piston 130 and the cylinder 120 to allow an outer circumferential surface of the piston 130 to be spaced apart from an inner circumferential surface of the cylinder 120. Thus, the introduced refrigerant may serve as a "gas bearing" that reduces friction between the piston 130 and the cylinder 120 while the piston 130 is reciprocated.

The motor 200 assembly may include a first stator 210 that surrounds the cylinder 120, a second stator 250 spaced apart from the first stator 210, and a permanent magnet 260 disposed between the first stator 210 and the second stator 250. In embodiments, one of the first stator 210 and the second stator 250 may be an outer stator, and the other one may be an inner stator. In FIG. 1, for example, the first stator 210 is the outer stator, and the second stator 250 is the inner stator.

The permanent magnet 260 may linearly reciprocate due to mutual electromagnetic force between the first stator 210 and the second stator 250. The permanent magnet 260 may include a single magnet having one pole, or a combination of multiple magnets having three poles. Also, the permanent magnet 260 may include a plurality of permanent magnets 260 disposed at an outside of the second stator 250.

The permanent magnet(s) 260 may be coupled to the piston 130 by a connection member 138. In detail, the connection member 138 may be coupled to the piston flange 132 and be bent to extend toward the permanent magnet(s) 260. As the permanent magnet(s) 260 is reciprocated, the piston 130 may be reciprocated together with the permanent magnet(s) 260 in the axial direction.

The motor assembly 200 may further include a fixing member 262 to fix the permanent magnet(s) 260 to the connection member 138. The fixing member 262 may be formed of a composition in which a glass fiber or carbon fiber is mixed with a resin. The fixing member 262 may be provided to surround the inside and outside of the permanent magnet(s) 260 to firmly maintain a coupled state between the permanent magnet(s) 260 and the connection member 138.

The first stator 210 may include coil winding bodies 240 and 246, and a plurality of core blocks 211 spaced a predetermined distance from each other in a circumferential direction of the coil winding bodies 240 and 246. Each of the plurality of core blocks 211 may include a first core block 212 and a second core block 213. Each of the first and second core blocks 212 and 213 may be manufactured by, for example, stacking a plurality of laminations in the circumferential direction and be disposed to surround the coil winding bodies 240 and 246.

The coil winding bodies 240 and 246 may include a bobbin 240, and a coil 246 wound in a circumferential direction of the bobbin 240. The coil 246 may have a polygonal section, for example, a hexagonal section.

The first stator 210 may include an insulation layer 248 disposed between the coil winding bodies 240 and 246 and the plurality of core blocks 211. The insulation layer 248 may be an insulation sheet or be manufactured by injection-molding a plastic material. For example, the insulation sheet may be formed of polyethylene terephthalate material.

An inner circumferential surface 214a (or a first surface) of the core block 211 that faces the second stator 250, and an outer circumferential surface 251 (or a second surface) of the second stator 250 that faces the inner circumferential surface 214a of the core block 211 may be spaced apart from each other to form an air gap. The air gap may be a portion at which the magnetic flux generated in the core block 211 contacts the magnetic flux of the permanent magnet 260. Thus, a thrust with respect to the permanent magnet 260 may be generated due to an interaction between the magnetic fluxes.

As the permanent magnet 260 has to be reciprocated in the air gap, the permanent magnet 260 may have a thickness less than a size G of the air gap. The air gap may have a uniform size G in an axial direction. That is, in FIG. 2, a distance between the outer circumferential surface 251 of the second stator 250 and an inner circumferential surface 214a of the core block 211 may be uniform in the axial direction. In one embodiment, the size G of the air gap may be the distance between the inner circumferential surface 214a of the core block 211 and the outer circumferential surface 251 of the second stator 250.

The core block 211 may include a coil cover 217. The coil cover 217 may be spaced apart from the bobbin 240 or from the coil 246 wound around the bobbin 240. The insulation layer 248 may be disposed between the coil cover 217 and the coil 246.

The linear compressor 100 may further include a support 137 to support the piston 130, and a back cover 170 spaced apart from a side of the support 137 and spring-coupled to the support 137. The support 137 may be coupled to the piston flange 132 and the connection member 138 by a predetermined coupling member, for example.

A suction guide 155 may be coupled to a front portion of the back cover 170. The suction guide 155 may guide the refrigerant suctioned through the suction inlet 104 to introduce the refrigerant into the suction muffler 150.

The linear compressor 100 may further include a plurality of springs 176 which are adjustable in natural frequency to allow the piston 130 to perform a resonant motion. The plurality of springs 176 may include a first spring supported between the support 137 and the stator cover 270, and a second spring supported between the support 137 and the back cover 170.

The linear compressor 100 may further include plate springs 172 and 174, respectively, disposed on both lateral sides of the shell 101 to allow inner components of the compressor 100 to be supported by the shell 101. The plate springs 172 and 174 may include a first plate spring 172 coupled to the first cover 102, and a second plate spring 174 coupled to the second cover 103. For example, the first plate spring 172 may be fitted into a portion at which the shell 101 and the first cover 102 are coupled to each other, and the second plate spring 174 may be fitted into a portion at which the shell 101 and the second cover 103 are coupled to each other.

Figure 3:
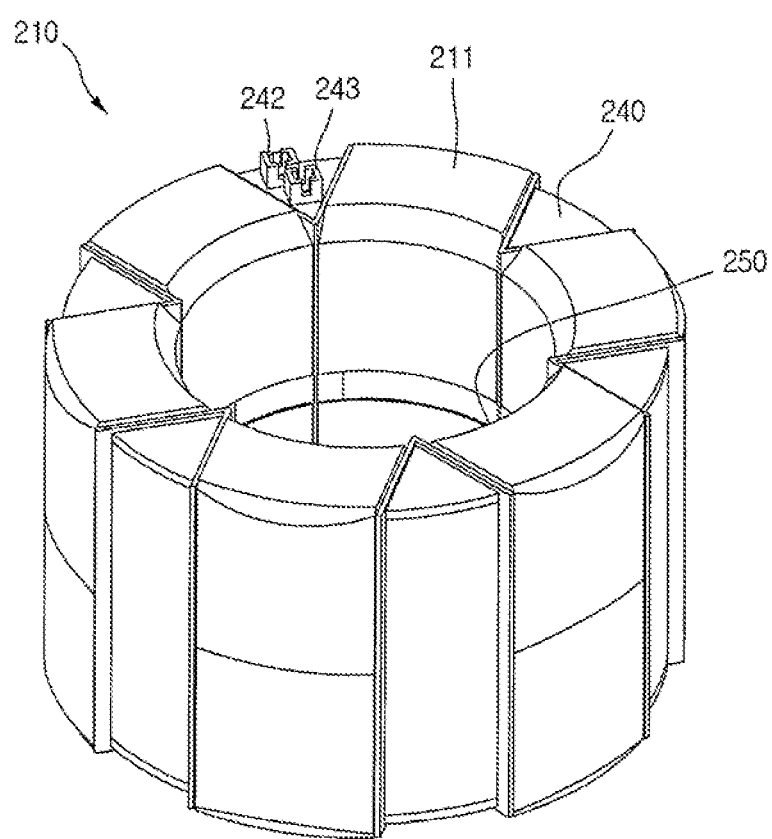
FIG. 3 is a perspective view of the linear motor of FIG. 2.
Figure 4:
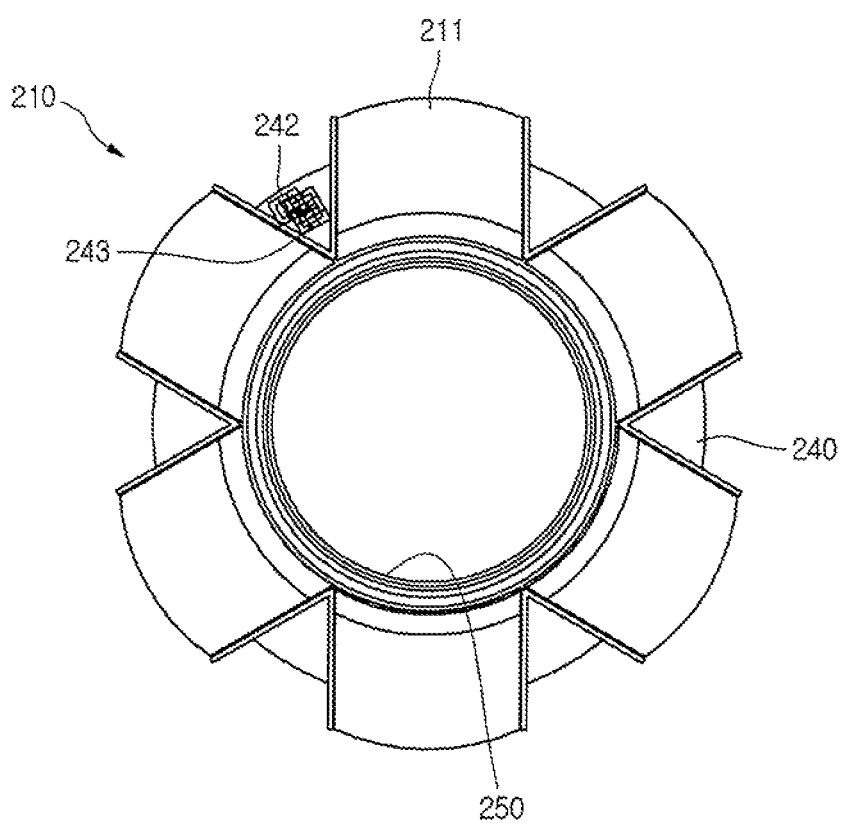
FIG. 4 is a plane view of the linear motor of FIG. 2.
Figure 5B:
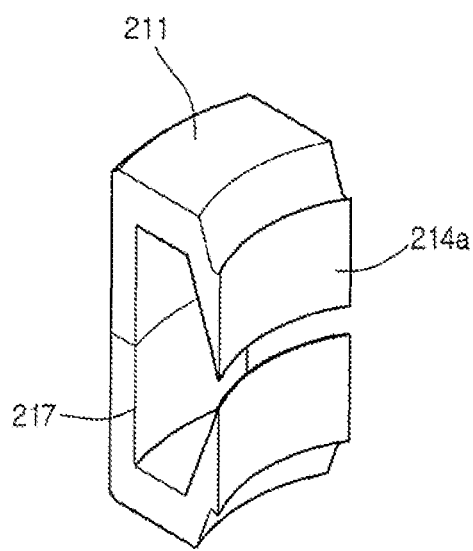

FIG. 3 is a perspective view of the linear motor of FIG. 2. FIG. 4 is a plane view of the linear motor of FIG. 2. FIGS. 5A-5B are view of a bobbin and a core block according to embodiments.

Referring to FIGS. 2 to 5, the first stator 210 of this embodiment may include six core blocks 211 or less. For example, in FIG. 3, the first stator 210 includes six core blocks 211.

The first stator 210 may include twelve core blocks 212 and 213 or less. That is, the first core block may be provided as six or less, and the second core block may be provided as six or less. In this embodiment, the first stator 210 including twelve core blocks will be described as an example.

As the number of core blocks 211 is reduced, a space between the core blocks 211 may increase. Thus, two terminal ports 242 and 243, to which input and output terminals of the coil may be connected, may be provided between two core blocks adjacent to each other in the bobbin 240. The two terminal ports 242 and 243 may include input terminal port 242 and output terminal port 243.

The input terminal may be inserted into the input terminal port 242, and the output terminal may be inserted into the output terminal port 243. In this case, as the input and output terminals are connected to the two terminal ports 242 and 243, respectively, workability may be improved, and also wires connected to the input and output terminals of the coil may be arranged.

In the bobbin, if the input terminal port is disposed between the two core block units adjacent to each other, and the output terminal port is disposed between another two core blocks adjacent to each other, a worker has to connect the input terminal to the input terminal port to rotate the first stator and then to connect the output terminal to the output terminal port. This takes a lot of time, and a number of processes increases. Also, as two power terminals to be connected to the input and output terminals are required, the power terminals ports may be complicated in structure.

The two terminal ports 242 and 243 may be integrally formed with each other. That is, the two terminal ports 242 and 243 may be disposed on one body, and the input terminal and the output terminal may be separately connected to the two terminal ports 242 and 243.

As the structure in which the input and output terminals are respectively coupled to the terminal ports is realized through well-known structure, detailed descriptions thereof have been omitted.

For example, the input and output terminals may not be connected to the terminal ports 242 and 243, respectively. The input and output terminals may, respectively, pass through the terminal ports 242 and 243 and then be connected to terminals which are not shown.

A portion of the bobbin 240, which has a largest diameter, may be defined as an outer circumferential surface 244 of the bobbin 240. The outer circumferential surface 244 of the bobbin 240 may be disposed nearest to the coil cover 217 of the core block 211.

Figure 6A:
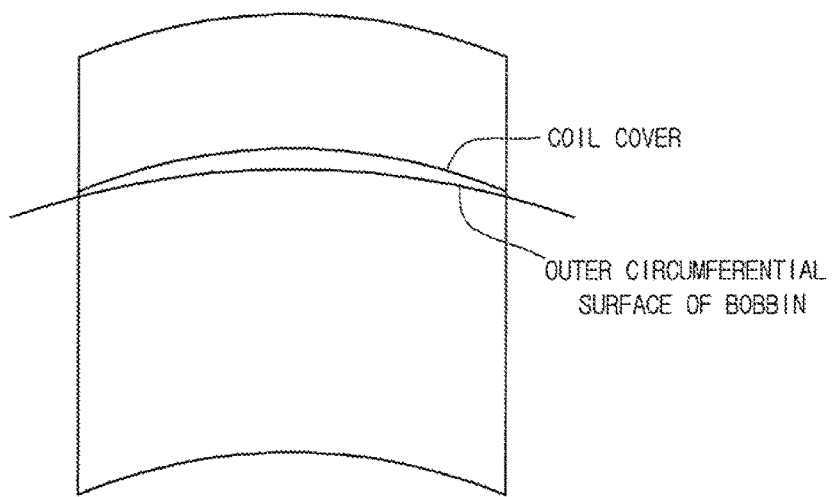
FIG. 6A is a view illustrating an arrangement relationship between first and second stators according to a related art.
Figure 6A:
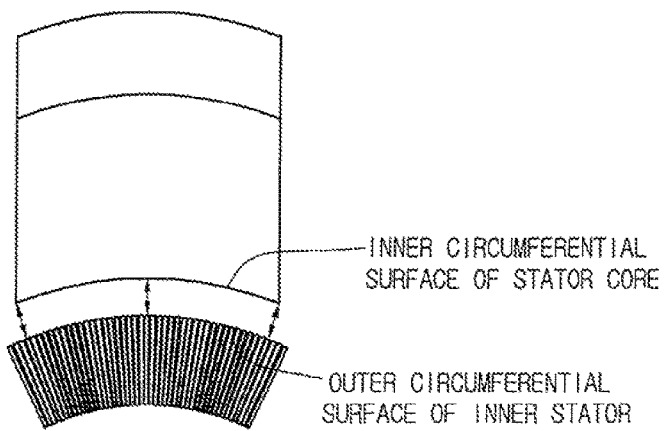
Figure 6B:
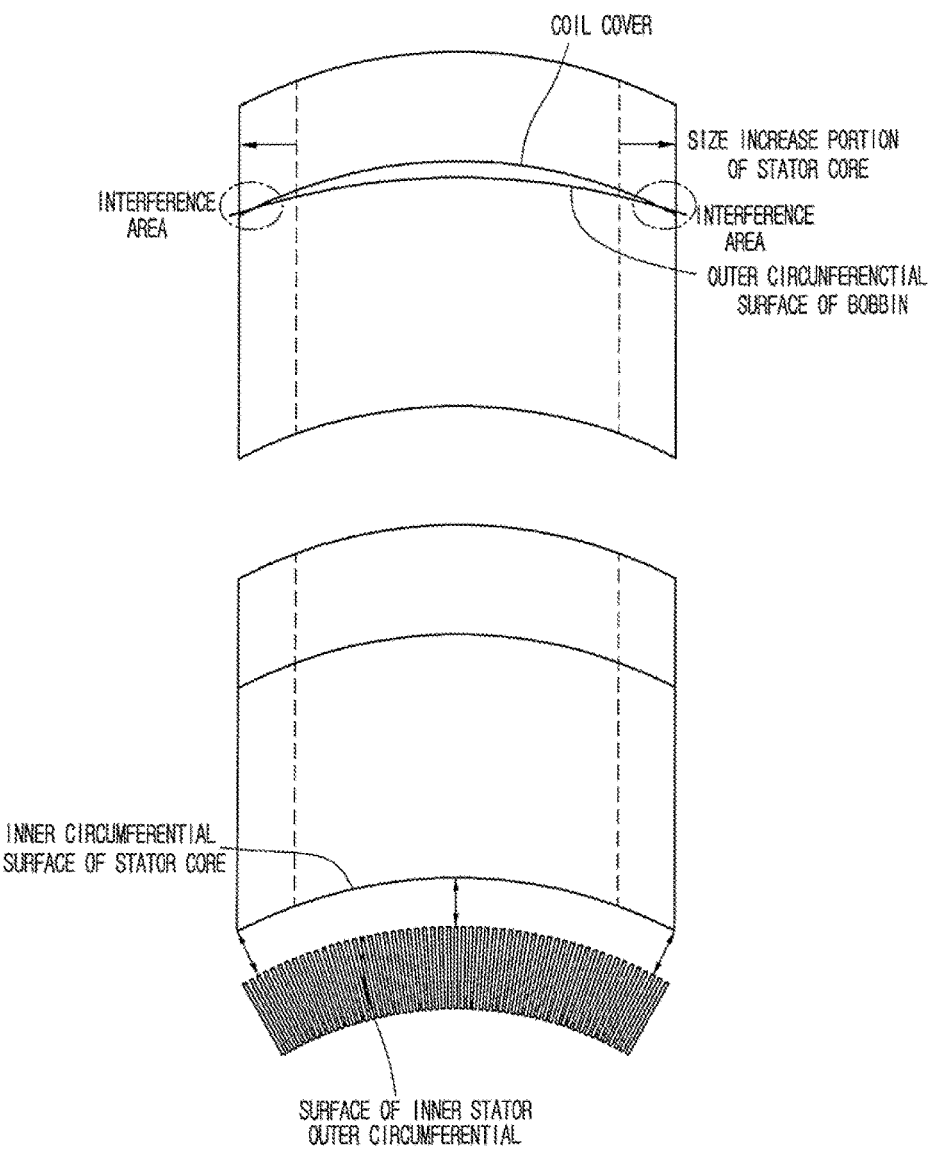
FIG. 6B is a view illustrating a limitation when the core block of FIG. 6A increases in size.
Figure 6C:
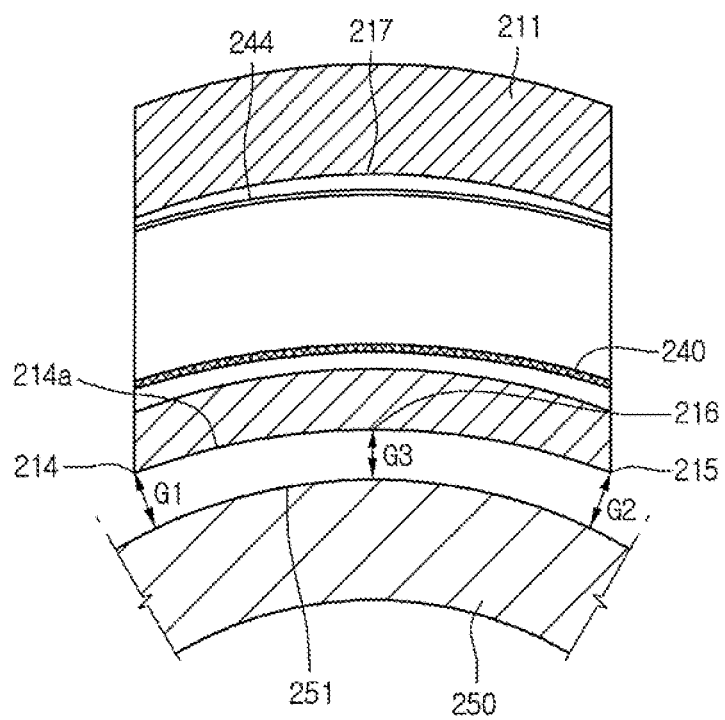
FIG. 6C is a sectional view taken along line VI-VI of FIG. 2.

FIG. 6A is a view illustrating an arrangement relationship between first and second stators according to a related art. FIG. 6B is a view illustrating a limitation when the core block of FIG. 6A increases in size. FIG. 6C is a sectional view taken along line VI-VI of FIG. 2.

Referring to FIG. 6A, when the core block according to the related art includes sixteen core blocks, an air gap between an inner circumferential surface of the core block and an outer circumferential surface of the inner stator (the second stator) may be uniform in a radial direction of the linear motor. Also, an outer circumferential surface (a portion of the bobbin having the largest diameter) of the bobbin, and a portion of the core block that covers the coil (hereinafter, referred to as "coil cover") may be spaced a predetermined distance from each other to prevent mutual interference therebetween from occurring.

In a structure illustrated in FIG. 6A, when the number of core blocks is reduced, one core block has to increase in area. That is, as each of the core blocks are formed by stacking a plurality of laminations in the circumferential direction, the number of laminations needs to increase so as to increase as area of one core block.

As illustrated in FIG. 6B, when the core block increases in area in a state in which the air gap between the inner circumferential surface of the core block and the outer circumferential surface of the second stator (the inner stator) is uniform in the circumferential direction of the linear motor, an interference between the coil cover of the core block and the outer circumferential surface of the bobbin may occur. In this case, in order to prevent the bobbin from interfering with the core block (coil cover), the bobbin has to be reduced in size. However, when the bobbin is reduced in size, a wound number of coil wound around the bobbin may be reduced.

However, in this embodiment, as illustrated in FIG. 6C, when a distance between the inner circumferential surface 214a of the core block 211 and the outer circumferential surface 251 of the second stator 250 is non-uniform in the circumferential direction of the linear motor, interference between the coil cover 217 of the core block 211 and the bobbin 240 may be prevented even though the core block 11 increases in size. That is, the distance between the inner circumferential surface 214a of the core block 211 and the outer circumferential surface of the second stator 250 may vary in a circumferential direction of the second stator 250.

In detail, in this embodiment, the inner circumferential surface 214a of the core block 211 may include a first point 214 at a first end of the inner circumferential surface 214a in a circumferential direction, a second point 215 at a second end of the inner circumferential surface 214a, and a third point 216 between the first and second points 214 and 215. An air gap between the inner circumferential surface 214a of the core block 211 at the third point 216 and the outer circumferential surface 251 of the second stator 250 has a size G3 (or a distance) less than a size G1 of an air gap between the inner circumferential surface 214a of the core block 211 at the first point 214 and the outer circumferential surface 251 of the second stator 250, and a size G2 of an air gap between the inner circumferential surface 214a of the core block 211 at the second point 215 and the outer circumferential surface 251 of the second stator 250.

The third point 216 may correspond to a central portion between the first and second points 214 and 215. That is, the third point 216 may correspond to a central portion of the inner circumferential surface 214a of the core block 211 in the circumferential direction. The air gap between the inner circumferential surface 214a of the core block 211 at the third point 216 and the outer circumferential surface 251 of the second stator 250 may have the minimized size G3.

The air gap between the core block 211 and the stator 250 may gradually increase in size from the third point 216 toward the first point 214 or the second point 215. That is, the air gap at the first and the second points 214 and 215 may be maximized in size, and the air gap may be gradually reduced in size in a direction in which the first and second points 214 and 215 get closer to each other.

According to a shape of the core block 211, the inner circumferential surface 214a of the core block 211 has a radius that is not uniform, but varies in a circumferential direction. Thus, in a whole linear motor, a line that connects the inner circumferential surfaces 214a of the core blocks 211 to each other in the circumferential direction may have a non-circular shape. Also, the inner circumferential surface of the core block 211 may vary in radius of curvature in the circumferential direction.

The core block 211 may have a minimum radius of curvature at the first and second points 214 and 215 and a maximum radius of curvature at the third point 216. Also, the core block 211 may gradually increase in radius of curvature from the first and second points 214 and 215 toward the third point 216.

According to this embodiment, as the air gap between the first stator and the second stator has the non-uniform size in the circumferential direction, the number of core blocks forming the first stator may be reduced. Therefore, costs and time for manufacturing each of the core blocks may be reduced, and also a number of processes for coupling the core block to the bobbin may be reduced.

Further, as the bobbin has a uniform size even though the number of the core blocks is reduced, reduction in wound number of coil may be prevented. Further, a moment for moving the permanent magnet in the circumferential direction may be generated between the first stator and the second stator. However, in this embodiment, as the air gap of the central portion of each of the core blocks has the minimized size, the permanent magnet may receive a biggest force at the central portion of the each of the core blocks. Thus, the moment for moving the permanent magnet may be minimized.

Although the structure of the first stator which is the outer stator is described in the foregoing description, embodiments are not limited thereto. For example, the inner stator may have the same structure of the above-described first stator.

Also, embodiments disclosed herein may be applied to technologies for maintaining a size of the bobbin while reducing a number of the core blocks, without being limited in the number of core blocks.

Figure 7:
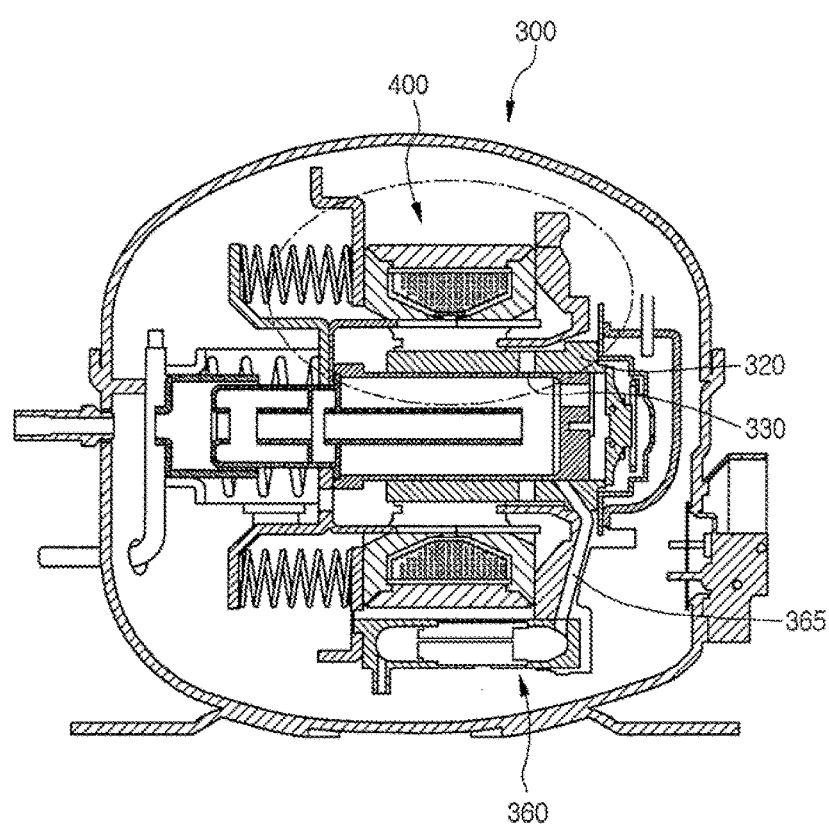
FIG. 7 is a schematic view of a linear compressor according to another embodiment.

FIG. 7 is a schematic view of a linear compressor according to another embodiment. A linear motor according to this embodiment may have the same structure as that of the previous embodiment except for a lubrication method between a piston and a cylinder. Thus, only specific portions of this embodiment will be described below, and repetitive disclosure has been omitted.

Referring to FIG. 7, a linear compressor 300 according to this embodiment may include a cylinder 320, a piston 330, a linear motor 400, and an oil supply device 360. A predetermined oil may be stored in a shell defining an outer appearance of the linear compressor 300. The oil supply device 360 to pump the oil may be provided in a lower portion of the shell 100. The oil supply device 360 may be operated by vibration generated due to linear reciprocating motion of the piston 330 to pump the oil in an upward direction.

The linear compressor 300 may further include an oil supply tube 365 that guides a flow of the oil from the oil supply device 360. The oil supply tube 365 may extend from the oil supply device 360 to a space between the cylinder 320 and the piston 330. The oil pumped from the oil supply device 360 may be supplied into the space between the cylinder 320 and the piston 330 via the oil supply pipe 365 to perform cooling and lubricating actions.

Embodiments disclosed herein provide a linear compressor and a linear motor for a linear compressor.

Embodiments disclosed herein provide a linear motor that may include a first stator; a second stator spaced apart from the first stator, and a permanent magnet disposed between the first stator and the second stator. The first stator may include a bobbin around which a coil may be wound; and a plurality of core block units or blocks that surrounds the bobbin. In at least one core block unit of the plurality of core block units, a distance between a first surface that faces the second stator and a second surface that faces the first surface varies in a circumferential direction of the second stator.

Embodiments disclosed herein further provide a linear motor for a linear compressor that may include a first stator; a second stator spaced apart from the first stator; and a permanent magnet disposed between the first stator and the second stator. The first stator may include a bobbin around which a coil may be wound; and a plurality of core block units or blocks that surrounds the bobbin. In at least one core block unit of the plurality of core block units, a first surface of the core block unit that faces the second stator has a radius of curvature that varies in a circumferential direction.

Embodiments disclosed herein further provide a linear compressor that may include a cylinder; a piston reciprocated within the cylinder in an axial direction; and a linear motor that provides power to the piston. The linear motor may include a first stator; a second stator spaced apart from the first stator; and a permanent magnet disposed between the first stator and the second stator. The first stator may include a bobbin around which a coil may be wound; and a plurality of core block units or blocks that surrounds the bobbin. In at least one core block unit of the plurality of core block units, a distance between a first surface that faces the second stator and a second surface that faces the first surface varies in a circumferential direction of the second stator.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A linear motor, comprising:
   a first stator;
   a second stator spaced apart from the first stator; and
   at least one permanent magnet disposed between the first stator and the second stator, wherein the first stator comprises:
     a bobbin around which a coil is wound; and
     a plurality of core blocks that surrounds the bobbin, and wherein, in at least one core block of the plurality of core blocks, a distance in a radial direction between a first surface of the at least one core block that faces the second stator and a second surface of the second stator that faces the first surface varies in a circumferential direction of the second stator, wherein the first surface of the at least one core block includes:
       a first point at a first end of the first surface;
       a second point at a second end of the first surface; and
       a third point between the first point and the second point, and wherein a distance in the radial direction between the first surface and the second surface at the third point is less than a distance in the radial direction between the first surface and the second surface at each of the first and second points.

2. The linear motor according to claim 1, wherein the third point corresponds to a central portion of the first surface, and wherein the distance in the radial direction between the first surface and the second surface at the third point is minimized.

3. The linear motor according to claim 1, wherein the distance in the radial direction between the first surface and the second surface gradually increases from the third point toward the first point or the second point.

4. The linear motor according to claim 1, wherein a line that connects the first surfaces of the plurality of core blocks to each other has a non-circular shape.

5. The linear motor according to claim 1, wherein each of the plurality of core blocks comprises a first core block and a second core block, and wherein a total number of the first and second core blocks is twelve or less.

6. The linear motor according to claim 1, wherein an input terminal port, to which an input terminal of the coil is connected, and an output terminal port, to which an output terminal of the coil is connected, are disposed in an area between two adjacent core blocks.

7. The linear motor according to claim 6, wherein the input terminal port and the output terminal port are integrally formed with each other.

8. The linear motor according to claim 6, wherein the input terminal of the coil is inserted into the input terminal port, and wherein the output terminal is inserted into the output terminal port.

9. A linear compressor comprising the linear motor according to claim 1.

10. A linear motor, comprising:
a first stator;
a second stator spaced apart from the first stator and located inside the first stator; and
at least one permanent magnet disposed between the first stator and the second stator, wherein the first stator comprises:
a bobbin around which a coil is wound; and
a plurality of core blocks that surrounds the bobbin, wherein, in at least one core block of the plurality of core blocks, a radius of curvature of an inner surface of the core block that faces an outer surface of the second stator varies in a circumferential direction, wherein a radius of curvature of the outer surface of the second stator is uniform in a circumferential direction, wherein the inner surface comprises:
a first point at a first end of the inner surface;
a second point at a second end of the inner surface; and
a third point between the first point and the second point, and wherein a distance in a radial direction between the inner surface and the outer surface at the third point is less than a distance in the radial direction between the inner surface and the outer surface at each of the first and second point.

11. The linear motor according to claim 10, wherein the third point corresponds to a central portion of the inner surface, and wherein the inner surface has a maximized radius of curvature at the third point.

12. The linear motor according to claim 10, wherein the inner surface has a radius of curvature that gradually decreases from the third point toward the first point or the second point.

13. The linear motor according to claim 10, wherein an input terminal port, to which an input terminal of the coil is connected, and an output terminal port, to which an output terminal of the coil is connected, are disposed in an area between two adjacent core blocks.

14. The linear motor according to claim 13, wherein the input terminal port and the output terminal port are integrally formed with each other.

15. The linear motor according to claim 10, wherein each of the plurality of core blocks comprises a first core block and a second core block, and wherein a total number of the first and second core blocks is twelve or less.

16. A linear compressor comprising the linear motor according to claim 10.

17. A linear compressor, comprising:
a cylinder;
a piston reciprocated within the cylinder in an axial direction; and
a linear motor that provides power to the piston, wherein the linear motor comprises:
a first stator;
a second stator spaced apart from the first stator; and
at least one permanent magnet disposed between the first stator and the second stator, wherein the first stator comprises:
a bobbin around which a coil is wound; and
a plurality of core blocks that surrounds the bobbin, wherein, in at least one core block of the plurality of core blocks, a distance in a radial direction between a first surface of the at least one core block that faces the second stator and a second surface of the second stator that faces the first surface varies in a circumferential direction of the second stator, wherein the first surface of the at least one core block comprises:
a first point at a first end of the first surface;
a second point at a second end of the first surface; and
a third point between the first point and the second point, and wherein a distance in the radial direction between the first surface and the second surface at the third point is less than a distance in the radial direction between the first surface and the second surface at each of the first and second points.

18. The linear compressor according to claim 17, wherein the third point corresponds to a central portion of the first surface, and wherein the distance in the radial direction between the first surface and the second surface at the third point is minimized.

19. The linear compressor according to claim 17, wherein the distance in the radial direction between the first surface and the second surface gradually increases from the third point toward the first point or the second point.

20. A linear compressor, comprising:
a cylinder;
a piston reciprocated within the cylinder in an axial direction; and
a linear motor that provides power to the piston, wherein the linear motor comprises:
a first stator;
a second stator spaced apart from the first stator and located inside the first stator; and
at least one permanent magnet disposed between the first stator and the second stator, wherein the first stator comprises:
a bobbin around which a coil is wound; and
a plurality of core blocks that surrounds the bobbin, wherein a line that connects inner surfaces of the plurality of core blocks that face the second stator to each other has a non-circular shape, wherein the second stator has a cylindrical shape and a uniform radius in a circumferential direction of the second stator, wherein each of the inner surfaces of the plurality of core blocks comprises:

a first point at a first end of the inner surface;
a second point at a second end of the inner surface; and
a third point between the first point and the second point, and wherein a distance in a radial direction between the inner surface and a corresponding outer surface of the second stator that faces the inner surface at the third point is less than a distance in the radial direction between the inner surface and the corresponding outer surface at each of the first and second points.

21. The linear compressor according to claim 20, wherein a radius of curvature of the inner surfaces varies in a circumferential direction.

\* \* \* \* \*